United States Patent [19]
DuRocher et al.

[11] Patent Number: 5,476,284
[45] Date of Patent: Dec. 19, 1995

[54] ENERGY ABSORBING COLLAPSIBLE STEERING APPARATUS

[75] Inventors: Dan DuRocher, Leanord; Ellsworth Miller, Rochester Hills, both of Mich.

[73] Assignee: ITT Corporation, Secaucaus, N.J.

[21] Appl. No.: 757,877

[22] Filed: Sep. 11, 1991

[51] Int. Cl.$^6$ .................................................. B62D 1/18
[52] U.S. Cl. ........................................ 280/777; 188/371
[58] Field of Search ........................... 280/777; 188/371, 188/374, 376, 377; 29/517; 74/492

[56] References Cited

U.S. PATENT DOCUMENTS

| | | | |
|---|---|---|---|
| 3,392,599 | 7/1968 | White | 74/492 |
| 3,424,263 | 1/1969 | Black | 180/82 |
| 3,482,466 | 12/1969 | Orlich et al. | 74/492 |
| 3,482,653 | 12/1969 | Maki et al. | 74/492 |
| 3,492,888 | 2/1970 | Nishimura et al. | 74/492 |
| 3,504,568 | 4/1970 | Nakamura | 74/492 |
| 3,505,897 | 4/1970 | Scheffler et al. | 74/492 |
| 3,523,587 | 8/1970 | Mazelsky | 180/82 |
| 3,538,785 | 11/1970 | Grangon | 188/371 |
| 3,600,970 | 8/1971 | Loofbourrow | 188/371 |
| 3,703,106 | 11/1972 | Arnston et al. | 74/492 |
| 3,788,148 | 1/1974 | Connell et al. | 188/371 |
| 3,832,911 | 9/1974 | Daniel et al. | 74/492 |
| 3,851,374 | 12/1974 | Mazelsky | 29/455 |
| 3,877,319 | 4/1975 | Cooper | 74/492 |
| 3,921,747 | 11/1975 | Suzuki et al. | 180/78 |
| 3,944,244 | 3/1976 | Albrecht | 280/87 R |
| 3,960,031 | 6/1976 | Chometon et al. | 74/492 |
| 4,086,825 | 5/1978 | Badcock et al. | 74/492 |
| 4,098,141 | 7/1978 | Yamaguchi | 74/492 |
| 4,269,043 | 5/1981 | Kizu et al. | 64/11 R |
| 4,274,299 | 6/1981 | Jones | 74/492 |
| 4,330,139 | 5/1982 | Katayama | 280/777 |
| 4,390,193 | 6/1983 | Strahan et al. | 280/777 |
| 4,411,167 | 10/1983 | Mohr | 74/492 |
| 4,445,708 | 5/1984 | Oakes | 188/371 |
| 4,531,619 | 7/1985 | Eckels | 188/371 |
| 4,632,424 | 12/1986 | Morris | 280/777 |
| 4,867,003 | 9/1989 | Beauch et al. | |

FOREIGN PATENT DOCUMENTS

| | | | |
|---|---|---|---|
| 2044905 | 3/1971 | Germany . | |
| 2020390 | 5/1972 | Germany | 280/777 |
| 473955 | 8/1991 | Germany . | |
| 201761 | 12/1982 | Japan | 280/777 |
| 92256 | 5/1984 | Japan | 74/492 |
| 860097 | 2/1961 | United Kingdom | 74/492 |
| 1398524 | 6/1975 | United Kingdom . | |

*Primary Examiner*—Karin L. Tyson
*Attorney, Agent, or Firm*—Robert P. Seitter; J. Gordon Lewis

[57] ABSTRACT

An energy absorbing apparatus includes first and second telescopingly arranged members. A non-deformable ring is mounted on one end of one of the members and engages a plurality of projections extending from the side wall of the other member. The projections extend longitudinally along the other member and are provided in various lengths, widths, heights and numbers to provide selective force versus displacement characteristics during the telescoping collapse of the first and second members with respect to each other. Preferably, the first and second members form a steering column housing for a vehicle steering apparatus.

19 Claims, 4 Drawing Sheets

ENERGY ABSORBING COLLAPSIBLE STEERING APPARATUS

CROSS REFERENCE TO RELATED APPLICATION

This application describes subject matter which is described and claimed in U.S. patent application Ser. No. 07/757,878, filed concurrently herewith on Sep. 11, 1991 in the names of Daniel J. DuRocher and Ellsworth S. Miller and entitled "Collapsible Steering Shaft Apparatus"

BACKGROUND OF THE INVENTION

1. Field of the Invention

The present invention relates, in general, to a vehicle steering apparatus and, more particularly, to an energy absorbing, collapsible steering apparatus.

2. Description of the Art

In today's vehicles, steering columns are typically designed to collapse during a collision so as to dissipate energy due to the occupant's impact with the steering wheel. Various steering columns have been devised to collapse when a certain force level is applied to the steering wheel by the occupant. Such steering columns are designed of two telescoping, tubular members. Various elements, such as frangible members, collapsible bellows, bearings, perforated sleeves, etc., are interposed between the overlapping portions of the tubular members to control the rate of collapse and to establish a predetermined force level required for the start of collapse of the steering column.

Recent federal standards requiring passive occupant restraint, which have resulted in the installation of inflatable air bags in the steering wheel, have imposed new requirements on the design of energy absorbing steering columns. Mechanically actuated air bags require that an impact force be transmitted from the bumper, through the frame, steering gear and steering column to an initiating sensor in the steering wheel. Thus, the steering column must remain intact for a certain amount of time prior to the initiation of any collapse in order for the deployment of the air bag to properly occur. The previously devised steering columns, while collapsible, do not sufficiently control the force versus displacement curve of the steering column to permit reliable use with an air bag.

Further, in such a collapsible steering apparatus, the steering shaft itself which is interconnected between the steering gear and the steering wheel must also collapse. Accordingly, such steering shafts have been formed of two separate shaft sections which are telescopingly engaged at one end. Various means have been employed to interconnect the overlapping ends of the two steering shafts to provide for simultaneous rotation of the shafts during normal use of the steering apparatus as well as to prevent any backlash or play between the two shafts. Grooves and through bores have been formed in the overlapping portions of the two shafts and filled with a moldable plastic to secure the shaft sections initially in place. The plastic is sheared by force applied to the steering wheel to enable telescoping collapse of the steering shafts. However, this technique is time consuming and requires additional manufacturing operations which add to the cost of the steering apparatus.

Thus, it would be desirable to provide a collapsible, energy absorbing steering apparatus which provides predictable force versus displacement characteristics during collapse. It would also be desirable to provide a collapsible, energy absorbing steering apparatus in which the collapse resisting force may be varied to any desired amount to meet various application requirements. Finally, it would be desirable to provide a steering apparatus in which the predictable force versus displacement characteristics can be easily implemented in an existing steering column without extensive modification to the steering column.

SUMMARY OF THE INVENTION

The present invention is an energy absorbing apparatus for absorbing energy between two, telescopingly arranged, movable members. The first member is fixedly mounted to a support surface. The second member is mounted so as to telescopingly engage the first member as force is exerted on the second member urging the second member over the first member.

According to the present invention, non-deformable means, such as a hardened ring, are formed on one end of the first member. A plurality of longitudinally extending projection means are deformably formed in and extend from the side wall of the second member for engaging the first end of the first member as the first and second members telescopingly engage each other and undergo reverse deformation into the side wall of the second member to control the amount and rate of telescoping engagement of the first and second members with respect to each other.

The projection means comprises at least one projection which has a predetermined length, a predetermined width, a predetermined projection or height from the side wall of the second member. Alternately, a plurality of projections are provided in a predetermined number about the circumference of the second member. Any one, some, or all of these variables, namely, length, width, height and number, may be varied to provide a predetermined force versus displacement characteristic for the telescoping energy absorbing apparatus.

Thus, in one embodiment, the projection may have a predetermined width, up to a width equal to the entire circumference of the second member to form a neck section. The projection means may also include a plurality of separate projections provided with equal length, width and height and in a predetermined number, equally circumferentially spaced about the second member. In an alternate embodiment, a second set of separate projections having a shorter length than a first set of projections and which start at a distance spaced from the start end of the first projections are provided to add additional force during the telescoping displacement or collapse of the second member over the first member. Alternately, the width of some or all of the projections may be varied in an increasing or decreasing manner, and either gradually in a tapered arrangement or in a series of discrete spaced steps. In the same manner, the height of some or all of the projections may be varied in an increasing or decreasing manner along the length of the second member in a gradual tapering configuration or in discrete, stepped portions of increasing or decreasing dimensions.

In a preferred embodiment of the present invention, the telescopingly engageable first and second members are formed as the upper and lower steering column members in a vehicle steering apparatus. The non-deformable means may comprise the formation of at least the first end portion of the first member from a hardened material, such as a hard steel, or a mild steel which has been subjected to hardening via heat treatment. Alternately, a non-deformable, hardened ring is mounted on and surrounds the first end of the first member. The ring has an exterior surface which engages the projection means formed on the second member to deform such projection means as the second member is telescopingly urged over the first member.

The energy absorbing apparatus of the present invention provides distinct advantages over previously devised energy absorbing apparatuses, particularly those devised for collapsible vehicle steering columns. The energy absorbing apparatus includes projections deformably formed in one of two telescopingly arranged members and a non-deformable portion formed on the opposed member. This simple arrangement avoids the need for external members which have been previously employed in such collapsible steering columns to provide controlled collapse of the two telescoping members. Further, the projection means can be varied in form by providing projections in varying numbers, varying lengths, varying widths and varying heights, or combinations thereof, to enable the force versus displacement characteristics of a collapsible, energy absorbing apparatus, such as the steering column of a vehicle, to be easily tailored to meet any application requirements. The formation of such projection means may be implemented in a collapsible steering column without requiring significant modifications to the steering column.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

The present invention is an energy absorbing apparatus for absorbing energy and controlling the collapse of two telescopingly engaged members. The energy absorbing apparatus has widespread use and, although the following description relates to the use of such an energy absorbing apparatus in a steering apparatus of a vehicle, it will be understood that the energy absorbing apparatus of the present invention may be employed in other diverse applications.

Figure 1:
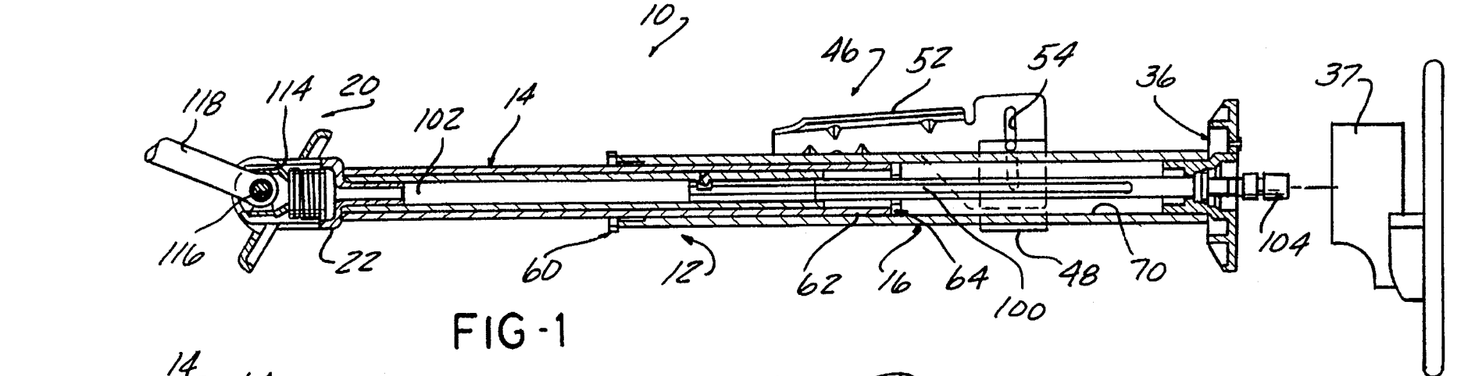
FIG. 1 is a partially cross sectioned, side elevational view of the energy absorbing apparatus of the present invention embodied in a vehicle steering column apparatus.
Figure 2:
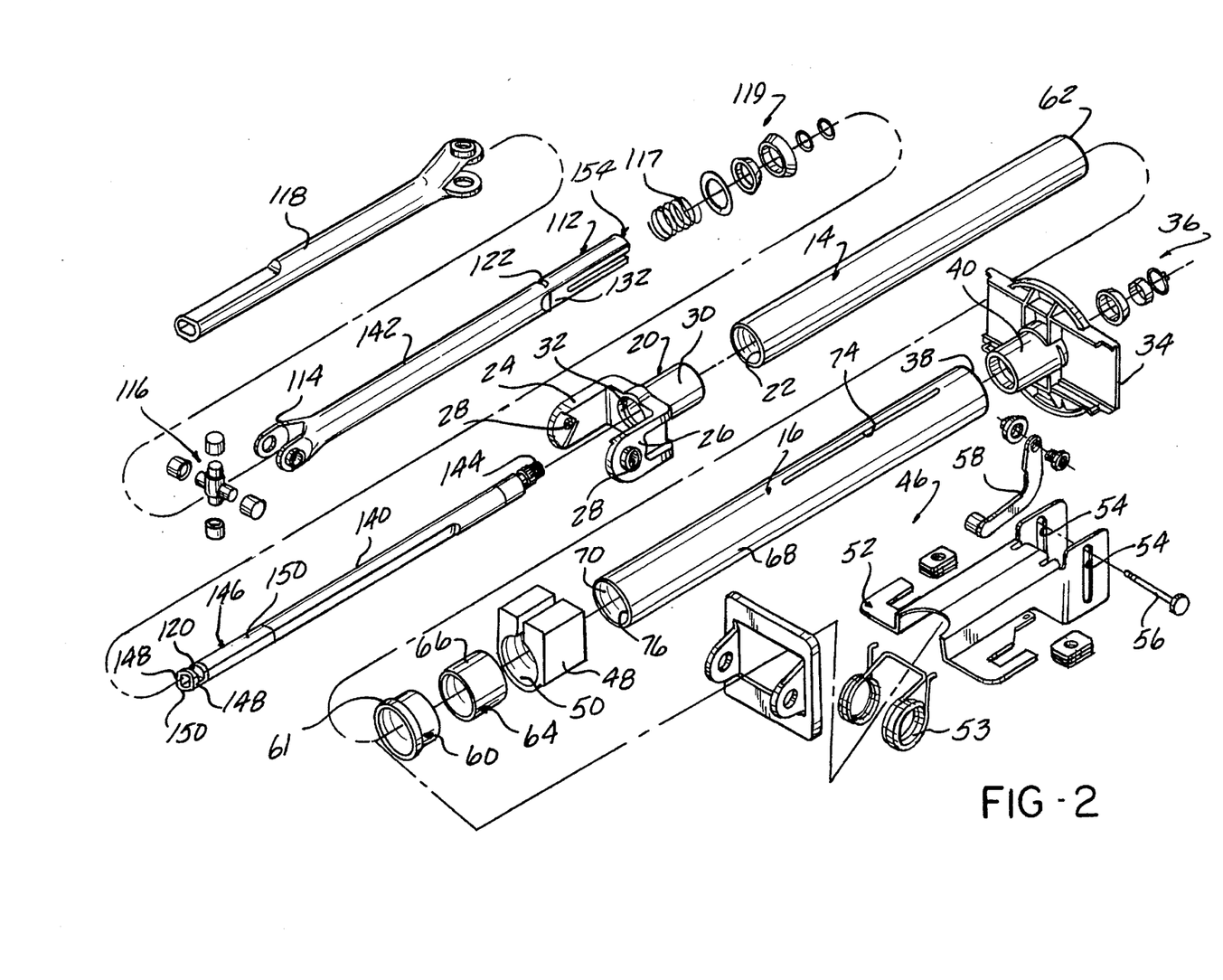
FIG. 2 is an exploded view of the steering column apparatus shown in FIG. 1.

Referring now to the drawing, and to FIGS. 1 and 2 in particular, there is illustrated an exemplary embodiment of the energy absorbing apparatus of the present invention employed in a steering apparatus 10 for use in a vehicle, such as an automobile, truck, etc. The steering column apparatus 10 includes a steering column 12 formed of a first, inner housing 14 and a second, outer housing 16. The first and second housings 14 and 16, respectively, are telescopingly arranged and overlap at respective first ends.

The first and second housings 14 and 16 are in the form of hollow tubular members having a circular cross section. Other shapes, such as square or a combination of square and arcuate, may also be used for the housings 14 and 16. Further, while the second housing 16 is depicted as telescoping over the first housing 14, a reverse arrangement where the second housing 16 telescopes inside of the first housing 14 may also be employed.

Although not forming a part of the present invention, the following description of the operative elements of the steering apparatus 10 will be provided for a complete understanding of the use and function of the energy absorbing apparatus of the present invention. As shown in FIGS. 1 and 2, the steering apparatus 10 includes a first bracket means 20 which is connected to one end 22 of the first steering column housing 14. The first bracket means 20 includes a yoke formed of two spaced, opposed legs 24 and 26 which are pivotally connected through bores 28 and pivot members, not shown, to a rigid support structure, such as the rigid structure of a vehicle. The end 22 of the first housing 14 bears on the yoke which fixedly supports the first housing 14 in a longitudinal direction. A tubular boss 30 extends outward from the yoke and engages one end 22 of the first steering column housing 14. The boss 30 may be connected to the first steering column housing 14 by means of a press fit or it may be joined to the first steering column housing 14 by other suitable means, such as welding, etc. A bore 32 extends through the boss 30 and slidably receives a steering shaft assembly, described hereafter.

A second bracket means 36 is connected to one end 38 of the second steering column housing 16. The second bracket means 36 includes a base 34 which is configured for receiving column switch assemblies, not shown, to control various operating circuits and elements on the vehicle. A boss 40 extends outward from the base 34 and is press fit into one end 38 of the second steering column housing 16. Alternately, the second bracket means 36 may be connected to the second steering column housing 16 by other means, such as welding, suitable fasteners, etc.

The second bracket means 36 is designed to rotatably support one end of the steering shaft assembly, described hereafter. A steering wheel 37, which optionally includes an inflatable air bag assembly mounted therein, is fixedly connected to the end of the steering shaft extending outward from the second bracket means 36, with the second bracket means 36 providing a mounting support for the steering wheel 37.

A third bracket means 46 is mounted intermediate the ends of the steering column housing 12 to provide selective tilting of the Steering column housing 12 about the first end 22 attached to the first bracket means 20. The third bracket means 46 includes a clamp block 48 having an internal bore 50 which is slidably mounted over the outer second steering column housing 16. A mounting plate 52 is attached to the clamp block 48 and surrounds an upper portion of the tubular second steering column housing 16. A pair of slots 54 are formed in arms extending outward from the mounting plate 52 and receive a bolt 56 which is connected to a pivotal lever 58. The plate 52 is attached to stationary support structure, such as stationary structure of a vehicle. A biasing spring 53 connected between the plate 52 and the clamp block 48 biases the steering column 12 in an upward direction. Movement of the lever 58 in a release direction moves the movable side portions of the clamp block 48 out of engagement with the steering column housing 16 and enables the entire steering column housing 12 to be pivoted to any desired angular position with respect to the pivotal first end 22 connected to the first bracket means 20. Opposite movement of the lever 58 locks the steering column housing 16 in a desired, fixed position.

Figure 3:
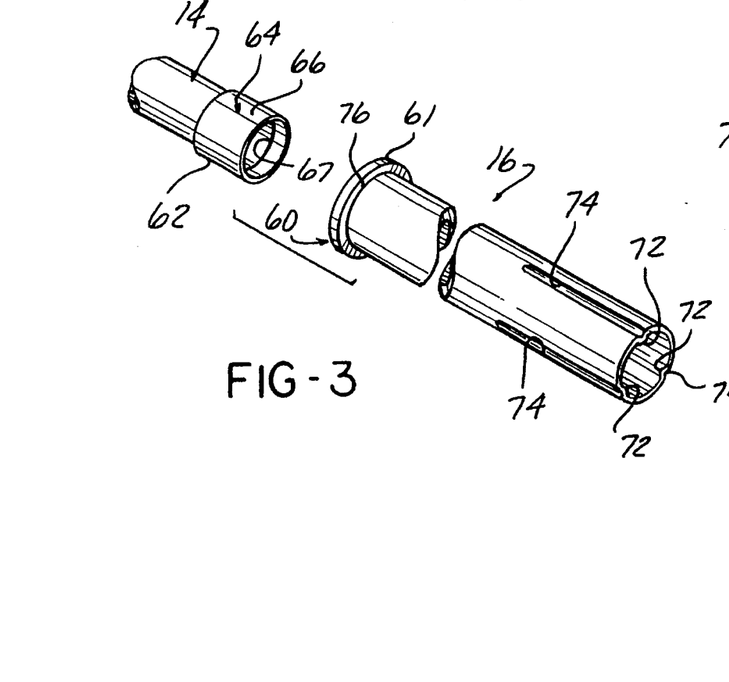
FIG. 3 is an enlarged, partial, perspective view showing one embodiment of the projection means of the present invention.

The energy absorbing features of the present invention are provided by a non-deformable means on one end of the first steering column housing 14. The non-deformable means may be constructed by hardening, such as via heat treatment, at least the end portion or all of the first steering column housing 14. However, in a typical steering column the first housing 14 is formed of a mild steel. A non-deformable, hardened ring, bushing or plug 64 is therefore mounted in a second end 62 of the first steering column housing 14, as shown in FIG. 3. The ring 64 has an outer, peripheral surface 66 which is slidably disposed within a second end portion 68 of the second steering column housing 16. The annular surface 66 of the ring 64 has a predetermined diameter so as to provide a predetermined amount of clearance with respect to the inner surface 70 of the second steering column housing 16; yet is larger than the diameter of the first housing 14. The ring 64 has an internal shoulder which seats on the end 67 of the housing 14. An outer bushing 60 is mounted in the end 76 of the second housing 16 and engages the first or inner housing 14 to provide a two point load support in conjunction with the ring 64. The outer bushing 60 is preferably formed of a resilient plastic and includes an enlarged, annular flange 61.

A plurality of projection means are formed in the second steering column housing 16 and are deformably engaged by the ring 64 during telescoping movement of the second steering column 16 over the first steering column housing 14. As described hereafter, the projection means may be provided in the form of at least one projection deformably formed in the second steering column housing 16 and extending radially inward from the inner surface 70 of the second steering column housing 16. The projection(s) may have any desired length, width or projection height and may be provided in any number on the second housing 16, including at least one projection; although a plurality of projections are preferred.

FIG. 3 depicts one embodiment of the projection means in the form of three, identical, equidistantly, circumferentially spaced projections 72 formed in the second steering column housing 16. The projections 72 may be formed by any suitable means, such as by forcing a hardened ball into the exterior surface of the second steering column housing 16 to form a groove 74 in the exterior surface of the second side wall of the steering column housing 16 and a corresponding projection extending radially inward from the side wall into the hollow interior of the second steering column housing 16.

As shown in FIGS. 2 and 3, each of the projections 72 has a predetermined, identical length and starts at one end a predetermined distance from the end 76 of the second steering column housing 16. During the assembly of the steering column housings 14 and 16, the first steering column housing 14 carrying the hardened ring 64 at one end is slidably inserted into the second end 76 of the second steering column housing 16 a sufficient distance to bring the ring 64 into engagement with the end or start of the projections 72. Force is then exerted on the first steering column housing 14 to forcibly urge the ring 64 into the projections 72 and thereby deforming the projections 72 radially outward toward the side wall of the second steering column housing 16. The ring 64 is advanced only a short distance from the start of the projections 72 to bring the first and second steering column housings 14 and 16 into a fixed, rigid engagement which eliminates play or backlash between the first and second steering column housings 14 and 16, respectively, During operation, when a force is exerted on the steering wheel, such as during a collision of the vehicle, such force will be transmitted through the steering wheel and second bracket means 36 to the first end 38 of the second steering column housing 16. This will forcibly urge the second steering column housing 16 over the first steering column housing 14 and cause a telescoping collapse of the first and second steering column housings 14 and 16 with respect to each other. During such collapse, the hardened ring 64 will engage and deform the projections 72 to absorb the force exerted on the steering column apparatus 10 at a controlled, predetermined rate depending on the size, shape and number of projections 72.

Figure 4:
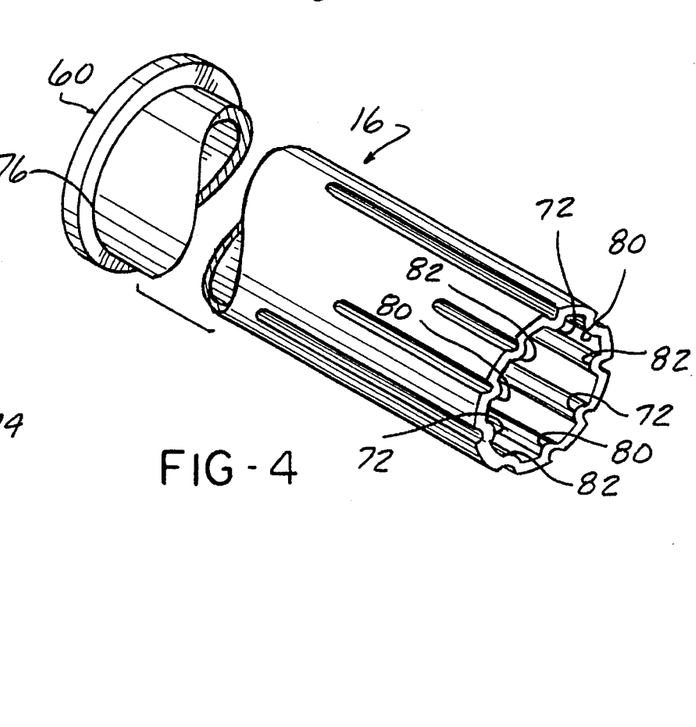
FIG. 4 is a perspective view of an another embodiment of the projection means of the present invention.

The projection means of the present invention may also be provided in alternate arrangements to provide different force versus displacement characteristics depending upon the requirements of a particular application. As shown in FIG. 4, a plurality of sets of projections, each set formed of a plurality of projections having a predetermined, distinct, discrete length, may be provided along the second steering column housing 16. A first set of projections 72 are formed as described above and illustrated in FIG. 3. The first set of projections 72 starts a predetermined first distance from the second end 76 of the second steering column housing 16. A second set of projections denoted by reference number 80 start a predetermined second distance from the second end 76 of the second steering column housing 16. The second distance is greater than the first distance associated with the beginning of the first set of projections 72 such that the second set of projections 80 start further along the length of the second steering column housing 16 from the second end 76. Additional sets, such as a third set of projections 82, may also be formed in the second steering column housing 16, starting at further distances from the second end 76 to provide additional force during collapse or telescoping engagement of the second steering column housing 16 with the first steering column housing 14. It will be noted that the projections of each set are interposed between the projections of the other sets, equidistantly about the periphery of the second housing 16.

Figure 5:
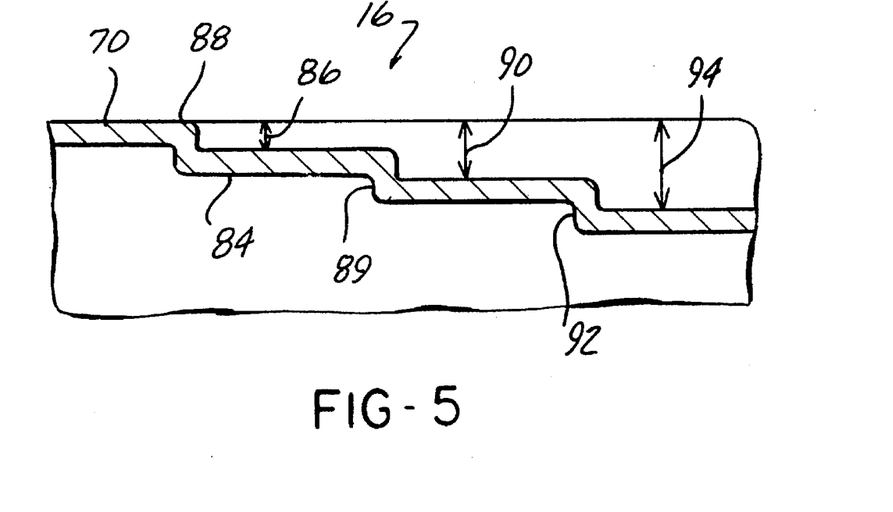
FIG. 5 is an enlarged, cross sectional view of yet another embodiment of the projection means of the present invention.

The height of each of the projection means may also be varied as shown in FIG. 5. In this embodiment, each projection 84 formed in the second steering column housing 16 has a predetermined, radially inwardly extending height or extent denoted by reference number 86 from the exterior surface 88 of the side wall of the second steering column housing 16. The projection 84 may extend at the predetermined height 86 for a predetermined distance along the length of the second steering column housing 16. The height of the projection 84 may be increased or decreased, either gradually or, in a discrete step 89 to a second, different height 90. The second height 90, although illustrated as being greater than the height 86 of the first portion of the projection 84, may alternately be less than the first height 86 depending upon the requirements of a particular application. A second discrete step 92 may also be formed in the projection 84 at a further distance from the second end 76 of the second steering column housing 16 to provide a third height or inward extension 94 of the projection 84 into the interior of the second steering column housing 16.

It will be seen that increasing or decreasing the radially inward extent of the projection 84 will vary the deformation force exerted on the second steering column housing 16 by the ring 64 and thereby provide a predetermined force versus displacement characteristic during the telescoping collapse of the first and second steering column housings 14 and 16.

Figure 6:
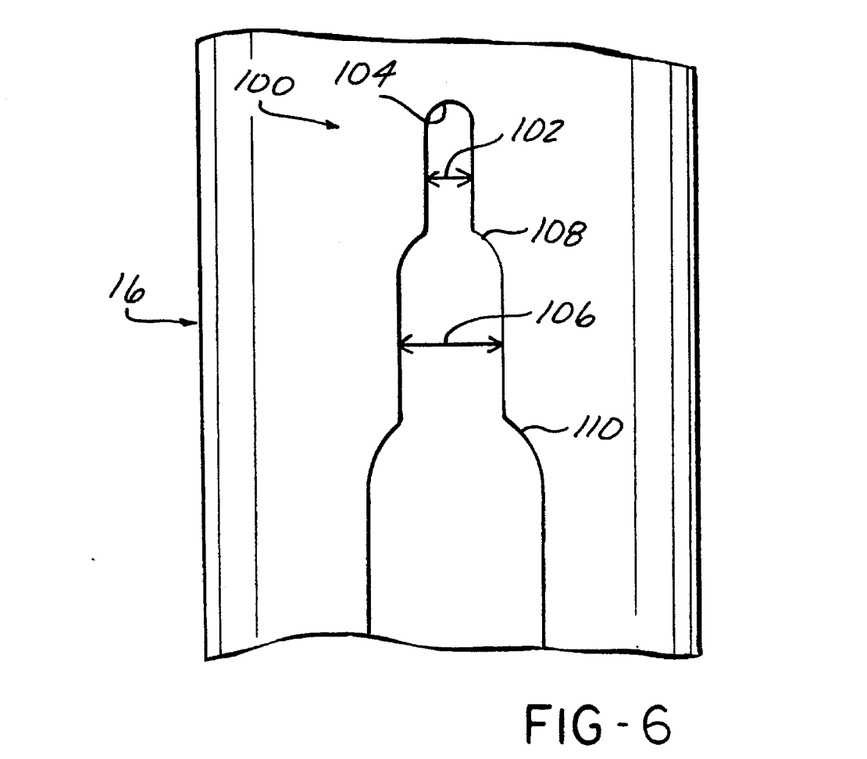
FIG. 6 is an enlarged, plan view of yet another embodiment of the projection means of the present invention.

The width of each projection may also be varied along the length of the steering column housing 16. Although relatively narrow width projections are preferred, the width of the projections, especially where only one projection is employed, may be increased up to the full circumference of the second housing 16 to form a circumferential necked section in the housing 16. In the embodiment shown in FIG. 6, each projection 100, as seen from the exterior of the housing 16, is provided with a first width 102 extending a predetermined distance from the first end of each projection 100. The width of each projection 100 may increase to a second width denoted by reference number 106 either gradually or in a discrete step 108 as shown in FIG. 6. Alternately, the width of each projection 100 may decrease, either gradually or in a discrete step, such as that corresponding to step 108. Additional steps 110 may also be provided in each projection 100 to further increase or decrease the width of each projection 100 and thereby provide a desired force versus displacement characteristic for the telescoping collapse of the steering column 12.

It will be understood that the projection means formed on the second steering column housing 16 may be provided in any of the above-identified configurations, including projections of various lengths, widths, projection heights and number of projections. For example, the width and projection height of the projections may be simultaneously increased or decreased along the length of such projections to provide a desired force versus displacement characteristic. Regardless of the manner of formation of the projection means, the end result is to provide a controlled force versus displacement characteristic for the telescoping first and second steering column housings 14 and 16 during a forced collapse of the first and second steering column housings 14 and 16 by a force exerted at one end of the second steering column housing 16.

The steering apparatus 10 of the present invention also includes a two-part steering shaft including a first or upper shaft 140 and a second or lower shaft 142. The first and second steering shafts 140 and 142, respectively, are also configured for telescoping, collapsible engagement coincident with the collapse of the steering column housing 12. By way of background, the first steering shaft 140 includes a threaded end portion 144 which receives the steering wheel 37 in a conventional manner. The opposed end 146 of the first steering shaft 140 is formed with a pair of opposed flats 148 which are interconnected by arcuate sides 150 which coincide with the generally tubular shape of the first shaft 140. The second end 146 of the first shaft 140 telescopingly fits within a hollow first end portion 112 of the second steering shaft 142. The second end 114 of the second shaft 142 is formed in a yoke which receives a conventional X-joint 116 for interconnection to a conventional steering shaft assembly 118.

A biasing spring 117 surrounds the lower end of the shaft 142 and seats on the yoke-shaped end 114 of the shaft 102. The spring 117 acts through a washer, cone, bearings 0-ring assembly denoted by reference number 119, to apply a load on the interconnected shafts 140 and 142.

Figure 7:
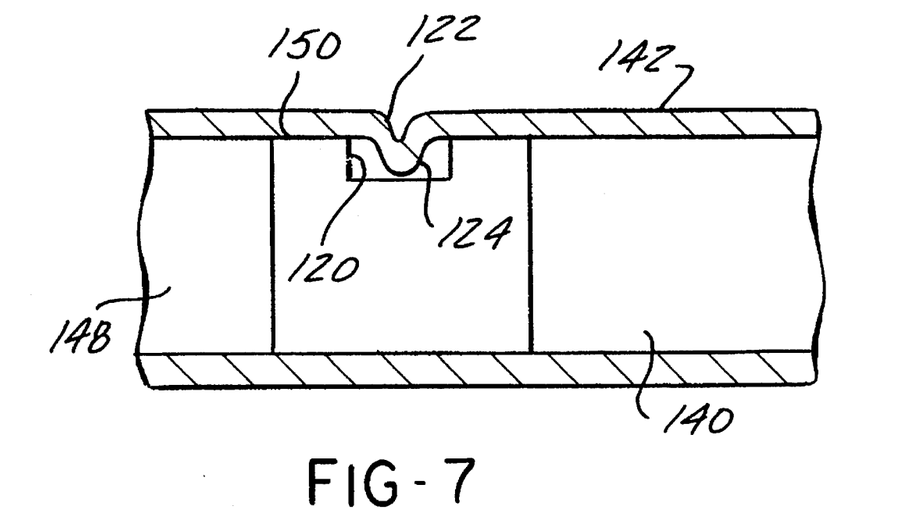
FIG. 7 is an enlarged, partially cross sectioned view showing the non-separable interconnection of the telescoping steering shaft portions of the steering column apparatus shown in FIG. 1.

According to the present invention and as shown in FIG. 7, a shallow notch 120 is formed in one of the arcuate side walls 152 on the second end 146 of the first shaft 140. The notch 120 is spaced from one end of the first shaft 140. A slot 122 is spaced from the second end 154 of the second shaft 142 and is adapted to overly the notch 120 in the first shaft 140 when the first and second shafts 140 and 142 are brought into telescoping, interfitting engagement. The portion of the second shaft 142 adjacent the slot 122 is then mechanically deformed, such as by staking, to form a depression denoted by reference number 124 which brings a portion of the second shaft 142 into mechanical connection with the notch 120 in the first shaft 140. This prevents any longitudinal outward separation of the first and second shafts 140 and 142 from each other during normal operation of the steering apparatus 10.

Figure 8:
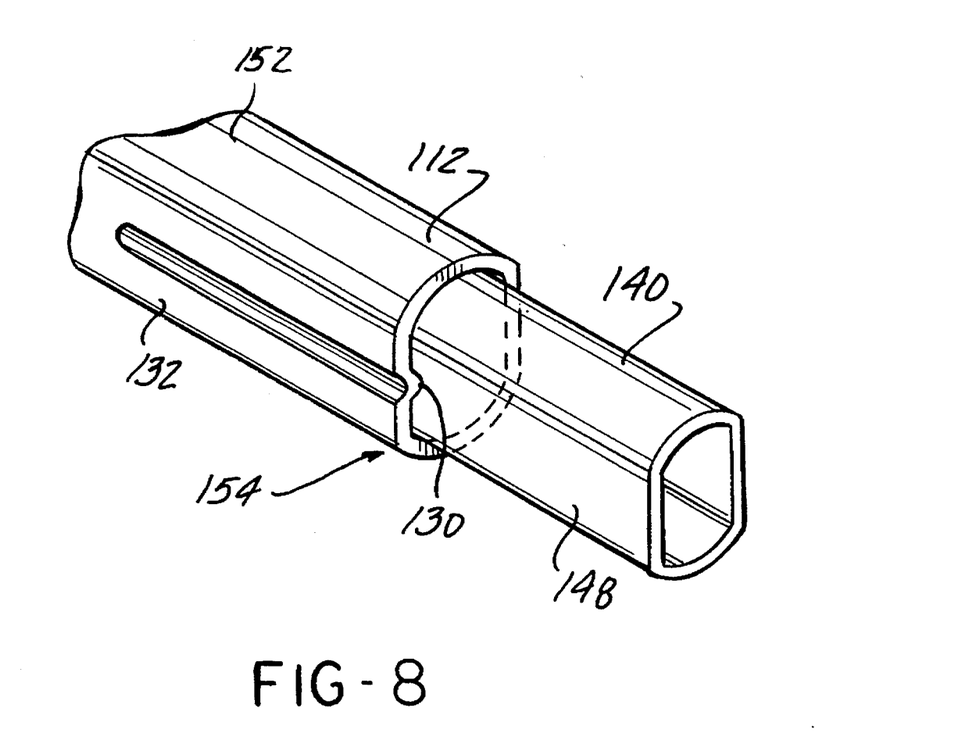
FIG. 8 is a partially broken away, perspective view showing a means for rigidly interconnecting the steering shaft portions of the steering column apparatus shown in FIG. 1.

The first and second shafts 140 and 142 are also interconnected in a rigid manner for simultaneous rotation by means of an elongated projection 130 (FIG. 8) which is formed in one of the flat side walls 132 in the second end 154 of the second shaft 142. The projection 130 extends radially inward from the side wall of the second shaft 142 and engages the opposed flat side wall 148 of the first shaft 140. This rigidly interconnects the first and second shafts 140 and 142 to prevent play or backlash. The mechanical connection between the projection 130 and the first shaft 140 also forces the first shaft 140 into rigid connection with the second shaft 142 and provides a predetermined amount of force which must be overcome to initiate telescoping movement of the first shaft 140 into the second shaft 142 during collapse of the steering column 10.

In summary, there has been disclosed a unique energy absorption apparatus which is particularly suited for use in vehicle steering column assemblies. The energy absorbing apparatus including a non-deformable portion formed on one telescoping member which deformably engages projections formed in another telescoping member. The hardened portion or member causes plastic deformation of the projections during telescoping movement of the outer member over the inner member according to a predetermined force versus displacement curve. The number, length, width and height of the projections may be varied to provide different force versus displacement characteristics to meet the needs of various applications.

What is claimed is:

1. An energy absorbing apparatus comprising:

first and second telescopingly engageable members, each having one end disposed in overlapping relationship with one end of the other such that an inner side wall of one slidably engages an outer side wall of the other during telescoping engagement;

a single, annular, non-deformable means formed on the entire circumference of a side wall of the one end of the first member; and at least one projection deformably extending longitudinally and radially from the side wall of the second member for engaging the non-deformable means on the first member as the first and second members are telescopingly urged together, substantially all of the at least one projection undergoing reverse deformation into the second member to control the telescoping collapse of the first and second members with respect to each other, the at least one projection varying in height from a first end along the length of the second member.

2. The energy absorbing apparatus of claim 1 wherein:
the at least one projection comprises a plurality of projections spaced about the periphery of the second member; the plurality of projections further comprising:
a first set of projections having a first predetermined length, the first set of projections starting a first predetermined distance from one end of the second member; and
at least one second set of projections starting a second predetermined distance greater than the first distance from the one end of the second member, the second set of projections having a second length.

3. The energy absorbing apparatus of claim 1 wherein the at least one projection increases in height from the first end along the length of the second member.

4. The energy absorbing apparatus of claim 1 wherein the at least one projection also varies in width from the first end along the length of the second member.

5. The energy absorbing apparatus of claim 4 wherein the at least one projection increases in width along the length of the second member.

6. The energy absorbing apparatus of claim 2 wherein the at least one projection varies in at least two of height, width and length along the length of the second member.

7. The energy absorbing apparatus of claim 1 wherein the first and second members are hollow, tubular members.

8. The energy absorbing apparatus of claim 1 wherein the non-deformable means comprises:
a hardened ring mounted on the one end of the first member and having an external surface disposed outward of the first member and engageable with the projection means on the second member.

9. The energy absorbing apparatus of claim 1 wherein the first member is disposed inwardly from the second member.

10. The energy absorbing apparatus of claim 1 wherein the first and second members form a steering column jacket surrounding a rotatable steering column shaft.

11. An energy absorbing apparatus comprising:
first and second telescopingly engageable hollow, tubular members, each having one end disposed in overlapping relationship with one end of the other;
an annular non-deformable ring mounted on the side wall, such that an inner side wall of the second member slidably engages an outer side wall of the first member during telescoping engagement of the first member and having an external surface disposed outward of the first member; and
a plurality of longitudinally extending, circumferentially spaced projections deformably formed in and extending radially inward from the side wall of the second member, the projections engaging the ring on the first member as the first and second members are telescopingly urged together, substantially all of each projection undergoing reverse deformation into the second member to control the telescoping collapse of the first and second members with respect to each other, certain ones of the projections having one end located at a predetermined position with respect to the first end of the second member and extending therefrom for a first length, certain others of the projections having one end located at another position with respect to the first end of the second member different from the predetermined position of the certain ones of the projections and extending therefrom for a second length.

12. A vehicle steering apparatus comprising:
a hollow, tubular, steering column housing formed of first and second, telescopingly engageable housing members, each housing member having one end disposed in overlapping relationship with one end of the other, such that an inner side wall of the second member slidably engages an outer side wall of the first member during telescoping collapse;
bracket means mounted on the steering column housing for mounting the steering column housing to stationary vehicle structure;
a steering column shaft formed of first and second telescopingly engaged shaft members rotatably mounted in the steering column housing and having ends extending outward from the opposed ends of the steering column housing;
a steering wheel fixedly mounted on one outward extending end of the steering column shaft;
a single, annular, non-deformable means formed on the entire circumference of a side wall of the one end of the first housing member; and
at least one projection deformably extending longitudinally and radially from the side wall of the second housing member for engaging the non-deformable means on the first housing member as the first and second housing members are telescopingly urged together, substantially all of the at least one projection undergoing referse deformation into the second housing member to control the telescoping collapse of the first and second housing members with respect to each other, the at least one projection varying in height from a first end along the length of the second member.

13. The vehicle steering apparatus of claim 12 wherein:
the at least one projection comprises a plurality of projections spaced about the periphery of the second housing member, the plurality of projections further comprising:
a first set of projections having a first predetermined length, the first set of projections starting a first predetermined distance from one end of the second housing member; and
at least one second set of projections starting a second predetermined distance greater than the first distance from the one end of the second housing member, the second set of projections having a second length.

14. The vehicle steering apparatus of claim 12 wherein the at least one projection increases in height from the first end along the length of the second housing member.

15. The vehicle steering apparatus of claim 12 wherein the at least one projection also varies in width from the first end along the length of the second housing member.

16. The vehicle steering apparatus of claim 13 wherein the projections of the first and second sets of projections vary in at least two of height, width and length along the length of the second housing member.

17. The vehicle steering apparatus of claim 12 wherein the non-deformable means comprises:
a hardened ring mounted on the one end of the first housing member and having an external surface disposed outward of the first member and engageable with the projection means on the second housing member.

18. The vehicle steering apparatus of claim 12 wherein the first housing member is disposed inwardly from the second housing member.

19. A vehicle steering apparatus comprising:

a hollow, tubular, steering column housing formed of first and second, telescopingly engageable housing members, each housing member having one end disposed in overlapping relationship with one end of the other, such that an inner side wall of the second member slidably engages an outer side wall of the first member during telescoping collapse;

bracket means mounted on the steering column housing for mounting the steering column housing to stationary vehicle structure;

a steering column shaft formed of first and second telescopingly engaged shaft members rotatably mounted in the steering column housing and having ends extending outward from the opposed ends of the steering column housing;

a steering wheel fixedly mounted on one outward extending end of the steering column shaft;

an annular non-deformable ring mounted on a first end of the first housing member and having an external surface disposed outward of the first housing member; and a plurality of longitudinally extending, circumferentially spaced projections deformably formed in and extending radially from the side wall of the second housing member, the projections engaging the ring on the first housing member as the first and second housing members are telescopingly urged together, substantially all of each projection undergoing deformation into the second housing member to control the telescoping collapse of the first and second housing members with respect to each other, certain ones of the projections having one end located at a predetermined position with respect to the first end of the second member and extending therefrom for a first length, certain others of the projections having one end located at another position with respect to the first end of the second member different from the predetermined position of the one end of the certain ones of the projections and extending therefrom for a second length.

* * * * *